Nov. 6, 1928.

J. G. PAULIN

APPARATUS FOR MEASURING VARIABLE FORCES

Filed Jan. 15, 1926

Nov. 6, 1928.
J. G. PAULIN
1,690,455
APPARATUS FOR MEASURING VARIABLE FORCES
Filed Jan. 15, 1926
2 Sheets-Sheet 2
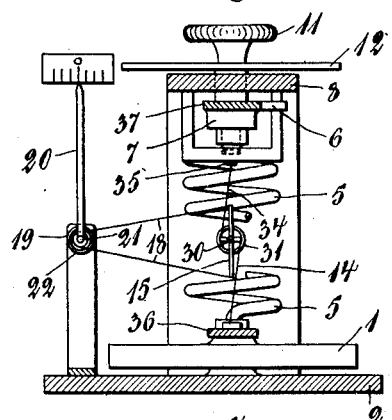
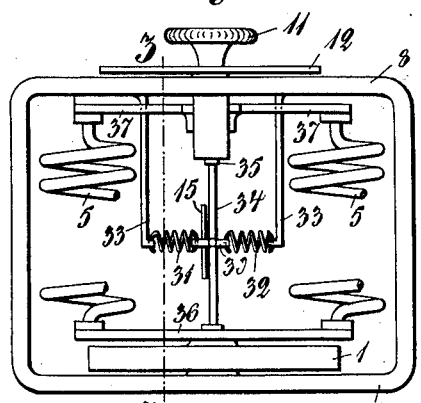
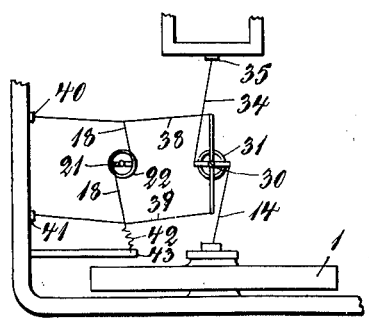

Patented Nov. 6, 1928.

1,690,455

UNITED STATES PATENT OFFICE.

JOSUA GABRIEL PAULIN, OF STOCKHOLM, SWEDEN

APPARATUS FOR MEASURING VARIABLE FORCES.

Application filed January 15, 1926, Serial No. 81,546, and in Germany November 23, 1925.

The present invention refers to apparatus for measuring variable forces such as gravity, electrical forces, pressures of gases and liquids and the like; and has for its object to provide a gearing specially adapted for supersensitive measuring devices, through which a very great ratio of gear and a correspondingly appreciable magnification of the movements are brought about without affecting the reliability of the apparatus. The movable measuring member operating under the influence of the variable forces, may be of any kind. It may, for instance, consist of a diaphragm of an aneroid barometer, of the rotary coil of an electric ammeter, of a magnet needle, or of any other measuring member adapted to be moved either by rotation or displacement. The great sensitivity aimed at by the invention is especially required in apparatus for measuring air or gas pressures and more particularly in apparatus of this kind which are used for determining differences in level by measuring atmospheric pressures.

The gearing according to the invention comprises as a main constituent, a lever in which the pivot bearing has been replaced by a resilient suspension produced by means of suspension springs, thus obviating the friction involved in bearings. The connection of this lever to the deflective measuring member (the diaphragm of a barometer etc.) on the one hand and an indicating device or the like on the other hand, is preferably provided in known manner by means of fine flexible wires or tapes.

A measuring apparatus the sensitivity of which is considerably magnified by means of a gearing according to the invention, is preferably provided with a compensating or zero-setting device for the movable measuring member, by means of which the deflecting power acting on the said member for the moment being may be wholly or partly compensated for. Thus a very large range of measurements may be covered in spite of the high sensitivity. The zero-setting device is preferably provided with a reading-off device indicating the strength of the compensated deflecting force, and will for this reason, always permit the absolute magnitude of the deflecting force to be measured.

The invention may be adapted without difficulty to portable apparatus, inasmuch as the supersensitive construction is practically unaffected by shocks and variable positions of the apparatus.

The accompanying drawing illustrates examples embodying the principle of the invention, particularly as applied to apparatus for measuring atmospheric pressures.

Figs. 3 and 4 disclose a second embodiment of an aneroid barometer viewed in partly sectioned elevation and from the side respectively.

Fig. 5 is a diagrammatic representation of a third embodiment.

Figure 1:
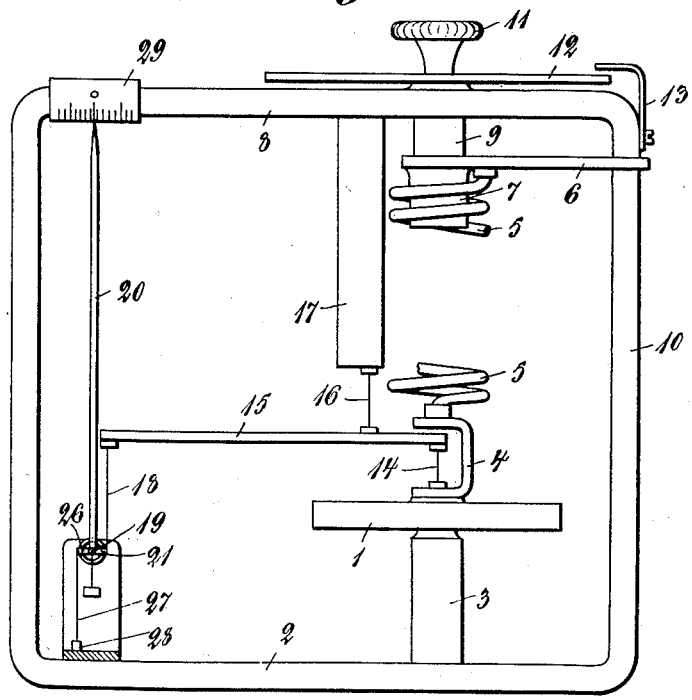
Fig. 1 is a front view of an aneroid barometer provided with a gearing according to the invention.
Figure 2:
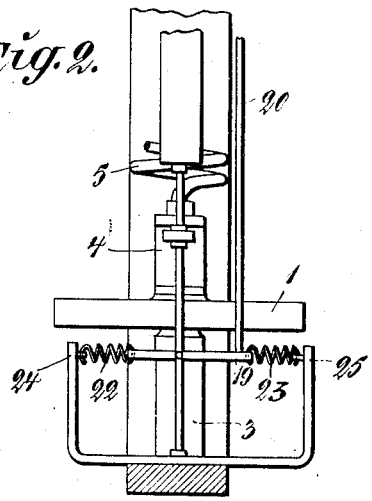
Fig. 2 shows a portion of the barometer according to Fig. 1 in elevation.

The pressure box 1 of the barometer according to Figs. 1 and 2 rests on a post 3 rigidly attached to a frame 2. Riveted or attached in some other suitable way to the upper side of the diaphragm of the box 1 is the one shank of yoke 4. Attached to the other shank of the yoke is the lower end of a helical spring 5 the upper end of which is secured to a nut 7 provided with a laterally extended arm 6, said nut being screwed onto a screw bolt 9 secured in the upper plate 8 of the frame 2. The arm 6 of the nut 7 is provided with a recess in its outer end, said recess forming, together with the right hand standard 10 of the frame, a slide-guide by means of which the nut 7 is retained in a certain angular position, when the screw bolt 9 is turned, the nut being, however, free to move up and down. The upper portion of the bolt 9 is formed as an adjusting button 11 and bears a dial disk 12 provided with a suitable scale, said disk being preferably of circular shape, and having beside it a pointer 13 screwed fast onto the frame.

The center of the diaphragm 1 is further connected to the shorter arm of a lever 15 by means of a fine flexible wire or tape 14, the said lever 15 being suspended from a supporting member 17 projecting down from the plate 8, preferably by means of a leaf- or band-shaped suspension spring 16. This suspension replaces the common pivot bearing, and forms a frictionless floating supporting means for the lever 15. The longer lever arm is connected by means of a flexible wire or a tape 18 with the rotary spindle 19 of an indicating device 20, through the medium of a very short lever arm 21. The indicating device 20 is fitted with a floating and frictionless supporting arrangement similar to that of the lever 15. This supporting means comprises two helical springs 22, 23 strained each between one end of the rotary spindle 19 and a rigid abutment 24 and 25 respectively. The tension springs 22, 23 have each a longitudinal tension suitable adapted in order to keep the pointer spindle 19 floating at the proper level. Besides, the tension springs 22, 23 should have a suitable torsional strain in such a manner as to have a tendency to turn the indicating device 20 in a clockwise direction (Fig. 1), whereby the tapes 14 and 18 are held under tension. By reason of the sag of the tension springs the axis of rotation of the spindle 19 does not coincide exactly with the geometrical axes of the tension springs. Now, in order that the level of the pointer spindle 19 may remain unaltered as far as possible, when the lever 15 is deflected, there is provided on the spindle 19 a second short lever arm 26 which extends in the opposite direction to the lever arm 21, and is connected with a fixed point 28 by means of a flexible, downwardly tightened tape 27. The indicating device 20 moves over a stationary scale 29. The air pressure momentarily acting on the diaphragm may be neutralized very accurately by means of the compensating device provided at the right, which neutralization is effected by the helical spring 5 acting on the diaphragm being strained or slackened off respectively by means of the adjusting button 11, until the indicating device 20 points over the zero mark in the center of the scale 29. Thus each value of the air pressure corresponds to a certain angular position of the circular disk 12 connected to the adjusting button 11. The said angular position is read off at the rigid pointer 13 with the aid of the graduation of the dial or disk 12. Preferably, the disk 12 is graduated on the basis of trials in such a manner that the prevalent absolute air pressure is readable direct in millimeters upon adjusting to zero.

Very small pressure variations may be established and measured with the aid of the scale 29. For instance, when the air pressure increases to some extent, the short arm of the lever 15 will be pulled somewhat downwards by reason of the deflection of the diaphragm, whereas the longer lever arm is elevated, and the pointer 20 is caused to swing to the left (Fig. 1) over the scale 29. At the same time the pointer spindle 19 is moved somewhat upwards on account of its resilient suspension, this upward displacement, however, being very small by reason of the connection with the rigid point 28.

As will be found from the foregoing, sliding friction does not occur in a single point of the gearing. As no difficulty will be experienced in making the inner friction in the flexible tapes and in the springs negligibly small by a suitable selection of the material of such parts, the device described constitutes an almost entirely frictionless gearing, which is, consequently, extremely reliable in operation.

In the embodiment according to Figs. 3 and 4 there is provided for the lever 15 a floating, supporting or suspending arrangement which is equal in all respects to the suspension described for the pointer 20. The lever is thus provided with a small rotary spindle 30 having attached to its ends helical springs 31, 32. The lever 15 consists in this case of a double bell crank lever having two short, approximately horizontally extending arms and two longer, vertically directed arms. One of the two short lever arms is connected by means of the flexible tape 14 to the centre of the diaphragm 1, and the other arm is connected by means of an upwardly extending tape 34 to a fixed point 35 of the frame 2. The two longer lever arms are connected by means of tapes 18 with a short-armed lever provided on the rotary spindle 19 of the pointer 20, said short-armed lever having approximately the form of a roller 21. The transmission of the movements of the lever 15 to the pointer 20 is thus effected as in the first-mentioned case. The zero-setting device differs from the one described before only in so far as there are provided two compensating springs 5 strained between a cross-rod 36 connected to the diaphragm 1 and one of two arms 37 connected with the nut 7.

Fig. 5 shows an arrangement having a still greater ratio of gear. The lever 15 is, the same as in Figs. 3 and 4, formed as a double bell crank lever the shorter arms of which are connected to the diaphragm 1 and to the fixed tensioning point 35 respectively. The longer arms of the lever 15 are not, however, connected directly to the small lever 21 of the pointer spindle 19, but the connection is effected by means of intermediate wires or tapes 38, 39 tightened each between one of the longer lever arms and one of the rigid points 40 or 41 respectively provided in the frame 2, the centers of said wires or tapes having tapes 18 connected thereto, which latter tapes are in turn connected with the ends of the small lever arms 21. In addition, a small helical spring 42 influences the center of the tape 29, the lower end of said spring being attached to a fixed tensioning point 43. By the action of said spring, as also of the springs 22, 23 acting on the pointer spindle, the additional tapes 38 and 39 are tightened in such a manner that their two halves are caused to form an obtuse angle. A small turning movement of the lever 15 obviously brings about a magnification of the one and a decrease of the other obtuse angle. In this case there will be a threefold magnification of the diaphragm movements, that is to say, through the lever 15, through the wire or tape structure 18, 38, 39 and, ultimately, through the pointer itself, forming together with the small lever 21 a lever with unequal arms.

It will be readily seen that there could be inserted in place of the wire or tape structure 18, 38, 39 a second lever 15, in order further to increase the ratio of gear. In fact, it is only on account of the lack of friction in the gearing described that it may be possible at all to arrange a plurality of intermediate levers 15 in succession without reducing the sensitiveness.

In order to damp the oscillations of the whole indicating device or of the constituent parts of the gearing, damping means of some kind, as known per se, may be provided, said damping means having to be selected in such a manner as not to bring in any sliding friction into the device as a whole. For this purpose, air or eddy current damping devices may be used, if desired.

I claim:

1. In an apparatus for measuring variable forces in combination with a movable measuring member operating under the influence of said forces and a device for indicating the movements of the measuring member, a movement transmitting lever having arms of different length, a yielding suspension device for said lever secured to the lever in the proximity of its centre of rotation, means connecting the shorter lever arm with the measuring member, and means connecting the longer lever arm with the indicating device so as to transmit magnified movements of the measuring member to the indicating device through the medium of said lever adapted to operate frictionless and without play.

2. In an apparatus for measuring variable forces in combination with a movable measuring member operating under the influence of said forces and a device for indicating the movements of the measuring member, a movement transmitting lever having arms of different length, a yielding suspension device for said lever secured to the lever in the proximity of its centre of rotation, means comprising flexible bands for connecting the shorter lever arm with the measuring member, and means comprising flexible bands for connecting the longer lever arm with the indicating device so as to provide, between the measuring member and the indicating device, an amplifying device operating frictionless and without play.

3. An arrangement according to claim 1, characterized by the yielding suspension device comprising a flexible suspending band secured to the lever in the proximity of its centre of rotation.

4. In an apparatus for measuring variable forces in combination with a movable measuring member operating under the influence of said forces and a device for indicating the movements of the measuring member, a movement transmitting lever having arms of different length, a yielding suspension device for said lever comprising two helical springs secured to the lever in the proximity of its centre of rotation, said springs being strained substantially in opposite directions perpendicularly to the plane of rotation of the lever, means comprising flexible bands for connecting the shorter lever arm with the measuring member, and means comprising flexible bands for connecting the longer lever arm with the indicating device so as to provide, between the measuring member and the indicating device, an amplifying device operating frictionless and without play.

5. An arrangement according to claim 4, characterized by the fact that the springs are arranged with an approximately horizontal axis, and are both adapted to carry the lever, the longitudinal tension of the springs being adapted in such a manner as to cause only an inconsiderable sag of the springs.

6. An arrangement according to claim 4, characterized by the springs having each a certain torsional tension with a unidirectional turning action on the lever, and keeping the connecting wires or tapes of the lever stretched.

7. An arrangement according to claim 4, characterized by the fact that a flexible tape is tightened between a fixed point and a point of the lever adjacent to the pivotal point of the latter, so as to be stretched in a direction substantially opposite to that of the forces exerted upon the lever by the connecting means.

8. In an apparatus for measuring variable forces in a combination with a movable measuring member operating under the influence of the said forces and a device for indicating said movements, a number of levers each having arms of different length, a yielding suspension divice for each of said levers secured to the lever in the proximity of its centre of rotation, means comprising flexible bands for connecting said levers in series so as to amplify the movements of the first lever in the series, and means comprising flexible bands for connecting the shorter arm of the first lever in the series with measuring member.

9. An arrangement according to claim 8, characterized by connecting in succession, a lever and a wire or tape structure consisting of two flexible wires or tapes one of which is tightened between a fixed point and a point of the lever, whereas, the other is tightened between a point of the first-mentioned wire or tape and a following lever.

10. In an apparatus for measuring variable forces in combination with a movable measuring member operating under the influence of said forces and an indicating lever, a movement transmitting lever having arms of different length, a yielding suspension device for said transmitting lever secured to the latter in the proximity of its centre of rotation, means comprising flexible bands for connecting the shorter arm of the transmitting lever with the measuring member, and means comprising flexible bands for connecting the longer arm of the transmitting lever with the indicating lever so as to provide, between the measuring device and the indicating lever, an amplying device operating frictionless and without play.

In testimony whereof I affix my signature.

JOSUA GABRIEL PAULIN.